(12) United States Patent
Cain et al.

(10) Patent No.: US 6,987,777 B1
(45) Date of Patent: Jan. 17, 2006

(54) PRIORITY FORWARDING IN A COMMUNICATION SYSTEM

(75) Inventors: Bradley Cain, Cambridge, MA (US); Larry DiBurro, Haverhill, MA (US); William A. Miller, Cary, NC (US); Mike Berger, Manchester, NH (US); Robert Lee, Lexington, MA (US)

(73) Assignee: Nortel Networks Ltd, (CA)

( * ) Notice: Subject to any disclaimer, the term of this patent is extended or adjusted under 35 U.S.C. 154(b) by 0 days.

(21) Appl. No.: 09/453,340

(22) Filed: Dec. 2, 1999

(51) Int. Cl.
H04J 3/16 (2006.01)

(52) U.S. Cl. .................................. 370/466; 370/412

(58) Field of Classification Search ............... 370/389, 370/397, 399, 465–467, 474, 395.2, 395.21, 370/395.3, 395.42, 395.5, 395.51, 395.52, 370/395.6, 395.61, 395.62, 395.64, 395.65, 370/412–418, 400, 468–469, 349, 395.63
See application file for complete search history.

(56) References Cited

U.S. PATENT DOCUMENTS

| 5,940,390 | A | * | 8/1999 | Berl et al. | 370/389 |
| 5,991,302 | A | * | 11/1999 | Berl et al. | 370/400 |
| 6,002,692 | A | * | 12/1999 | Wills | 370/465 |
| 6,067,298 | A | * | 5/2000 | Shinohara | 370/395 |
| 6,314,095 | B1 | * | 11/2001 | Loa | 370/352 |
| 6,487,206 | B1 | * | 11/2002 | Baruch | 370/395.1 |
| 6,697,352 | B1 | * | 2/2004 | Ludwig et al. | 370/349 |

OTHER PUBLICATIONS

Cisco White Paper, "Policy-Based Routing" dated 1996, pp. 1-7.*
IEEE, The New IEEE Standard Dictionary of Electrical and Electronics Terms, Published by IEEE, p. 1136.*
Mercer et al., An Evaluation of Priority Consistency in Protocol Architectures, School of Computer Science, Carnegie Mellon University, 1991 IEEE, pp. 386-398.
Tokuda et al., Priority Inversions in Real-Time Communication, School of Computer Science, Department of Electrical and Computer Engineering, Carnegie Mellon University, CH 2803-5/89/0000/0348; 1989 IEEE, pp. 348-359
Tokuda, et al., ARTS: A Distributed Real-Time Kernal, Computer Science Department, Carnegie Mellon University, 8283 Operating Systems Review (SIGOPS), Jul. 23, 1989, No. 3, New York US, pp. 29-53.

* cited by examiner

Primary Examiner—Bob Phunkulh
Assistant Examiner—Robert W. Wilson
(74) Attorney, Agent, or Firm—Steubing McGuinness & Manaras LLP

(57) ABSTRACT

In a technique for priority forwarding, an upper layer protocol that requires priority forwarding includes a priority function that is invoked by a lower layer protocol in order to obtain the priority for a message. The upper layer protocol provides the priority function to the lower layer protocol when the upper layer protocol is installed in the protocol stack. The lower layer protocol invokes the priority function before passing a message to the upper layer protocol in order to determine a priority for the message. The lower layer protocol places the message in the appropriate queue based upon the priority indicator obtained from the upper layer protocol's priority function.

15 Claims, 6 Drawing Sheets

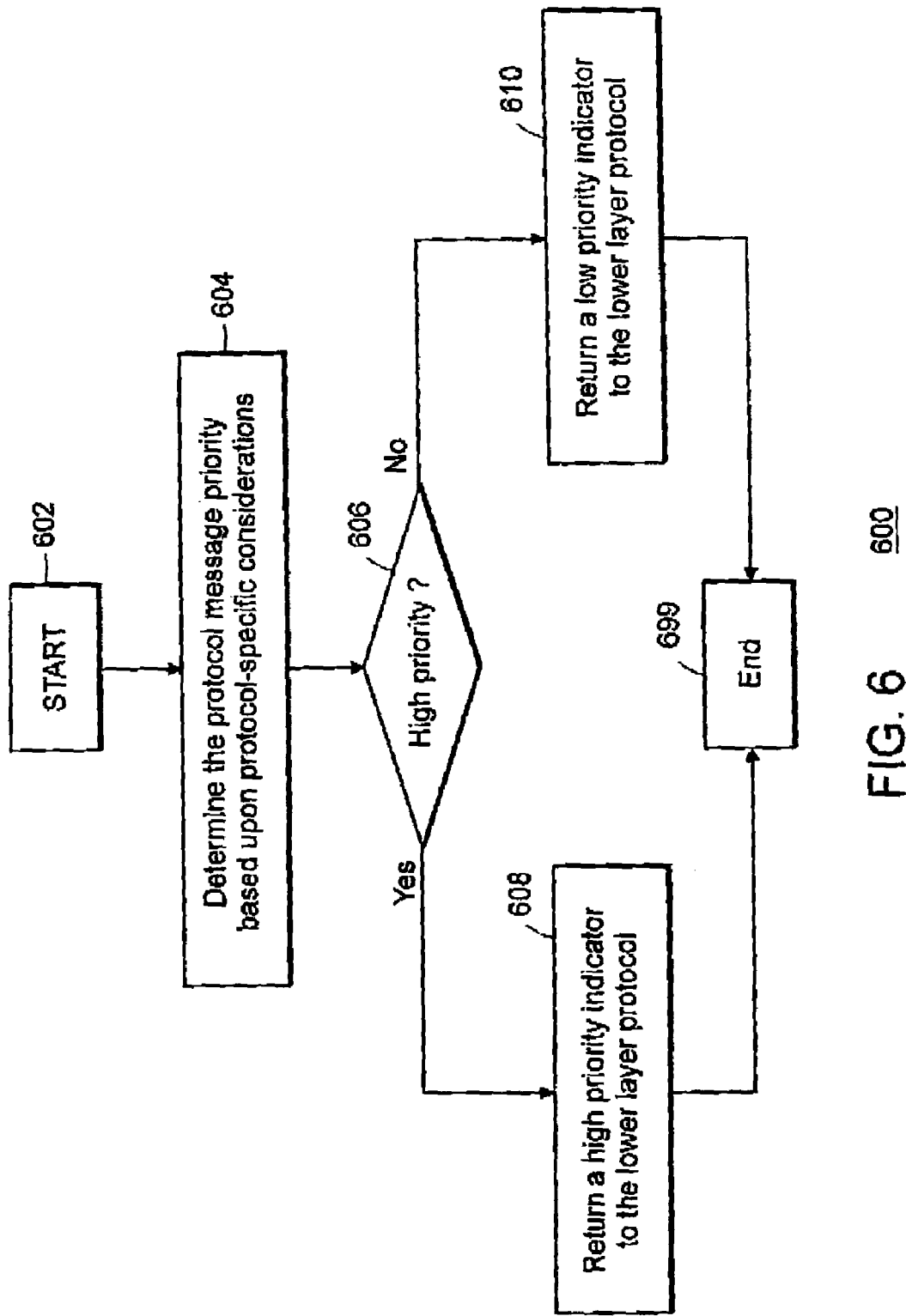

PRIORITY FORWARDING IN A COMMUNICATION SYSTEM

FIELD OF THE INVENTION

The present invention relates generally to communication systems, and more particularly to priority forwarding of protocol messages among layers in a protocol stack.

BACKGROUND OF THE INVENTION

In today's information age, the various network devices in a communication network utilize numerous protocols for exchanging information. These protocols are typically implemented in layers, which are often referred to collectively as a "protocol stack." Each protocol layer in the protocol stack provides services to the protocol layer above it in the protocol stack and consumes services from the protocol layer below it in the protocol stack.

Many protocol stacks use a message passing architecture for passing protocol messages between protocol layers. In particular, queues are typically used to transfer protocol messages between a particular protocol layer and its adjacent protocol layers. When a lower layer protocol needs to forward a protocol message to an upper layer protocol, the lower layer protocol places the protocol message on a queue corresponding to the upper layer protocol.

One advantage of such a message passing architecture is that the protocol message order is maintained. Since a queue is a first-in-first-out (FIFO) mechanism, protocol messages are removed from the queue in the same order that the protocol messages are placed into the queue. The lower layer protocol places protocol messages into the queue in the order in which the protocol messages are received. Therefore, the upper layer protocol removes the protocol messages from the queue in the order in which the protocol messages are received.

One disadvantage of such a message passing architecture is that there is no consideration for protocol message priority. Almost invariably, certain types of protocol messages are more important than others, and are therefore preferably processed ahead of less important protocol messages. Unfortunately, when a queue is used for message passing, the lower layer protocol places high priority protocol messages and low priority protocol messages on the queue in the order in which they are received, and therefore the high priority protocol messages continue to be processed in the order in which they are received rather than being processed ahead of earlier low priority messages.

One way to provide priority forwarding for protocol messages is to utilize two (2) queues, namely a high priority message queue and a low priority message queue. The lower layer protocol places high priority protocol messages on the high priority message queue, and places low priority protocol messages on the low priority message queue. The upper layer protocol processes all protocol messages in the high priority message queue before processing any protocol messages in the low priority queue. In this way, the high priority protocol messages are processed ahead of earlier low priority messages.

In order to support such a priority forwarding mechanism, the lower layer protocol must be able to determine a priority for each protocol message that it forwards to the upper layer protocol. Typically, the lower layer protocol logic is modified to interpret certain protocol elements of the upper layer protocol in order to determine a priority for each protocol message. This adds complexity to the lower layer protocol, and makes the upper layer protocol dependent on the specific lower layer protocol for receiving priority forwarding services.

Thus, there is a need for an improved priority forwarding mechanism.

SUMMARY OF THE INVENTION

In accordance with one aspect of the invention, an upper layer protocol that requires priority forwarding includes a priority function that is invoked by a lower layer protocol in order to obtain the priority for a protocol message. The upper layer protocol provides the priority function to the lower layer protocol when the upper layer protocol is installed in the protocol stack. The lower layer protocol invokes the priority function before passing a protocol message to the upper layer protocol in order to determine a priority for the protocol message. The lower layer protocol places the protocol message in the appropriate queue based upon the priority indicator obtained from the upper layer protocol's priority function. In this way, the lower layer protocol is not required to interpret any protocol elements of the upper layer protocol in order to determine a priority for each protocol message, and the upper layer protocol is not dependent on a specific lower layer protocol for priority forwarding.

BRIEF DESCRIPTION OF THE DRAWINGS

The foregoing and other objects and advantages of the invention will be appreciated more fully from the following further description thereof with reference to the accompanying drawings wherein:

FIG. 6 is a logic flow diagram showing exemplary priority function logic in accordance with an embodiment of the present invention.

DETAILED DESCRIPTION OF A PREFERRED EMBODIMENT

In an embodiment of the present invention, an upper layer protocol that requires priority forwarding includes a priority function that is invoked by a lower layer protocol in order to obtain the priority for a protocol message. When the upper layer protocol is installed in the protocol stack above the lower layer protocol, the upper layer protocol provides the priority function to the lower layer protocol, preferably by passing to the lower layer protocol a reference to the priority function (such as an address of the priority function). When the lower layer protocol receives a protocol message for the upper layer protocol, the lower layer protocol invokes the upper layer protocol's priority function and obtains therefrom a priority indicator indicating whether the protocol message is a high priority protocol message or a low priority protocol message. The lower layer protocol places the protocol message in the appropriate queue based upon the priority indicator obtained from the upper layer protocol's priority function. Specifically, if the priority indicator indicates that the protocol message is a high priority protocol message, then the lower layer protocol places the protocol message in the high priority message queue. If the priority indicator indicates that the protocol message is a low priority protocol message, then the lower layer protocol places the protocol message in the low priority message queue. In this way, the lower layer protocol is not required to interpret any protocol elements of the upper layer protocol in order to determine a priority for each protocol message, and the upper layer protocol is not dependent on a specific lower layer protocol for priority forwarding.

There are many different protocols and protocol layering schemes in use today.

Figure 1:
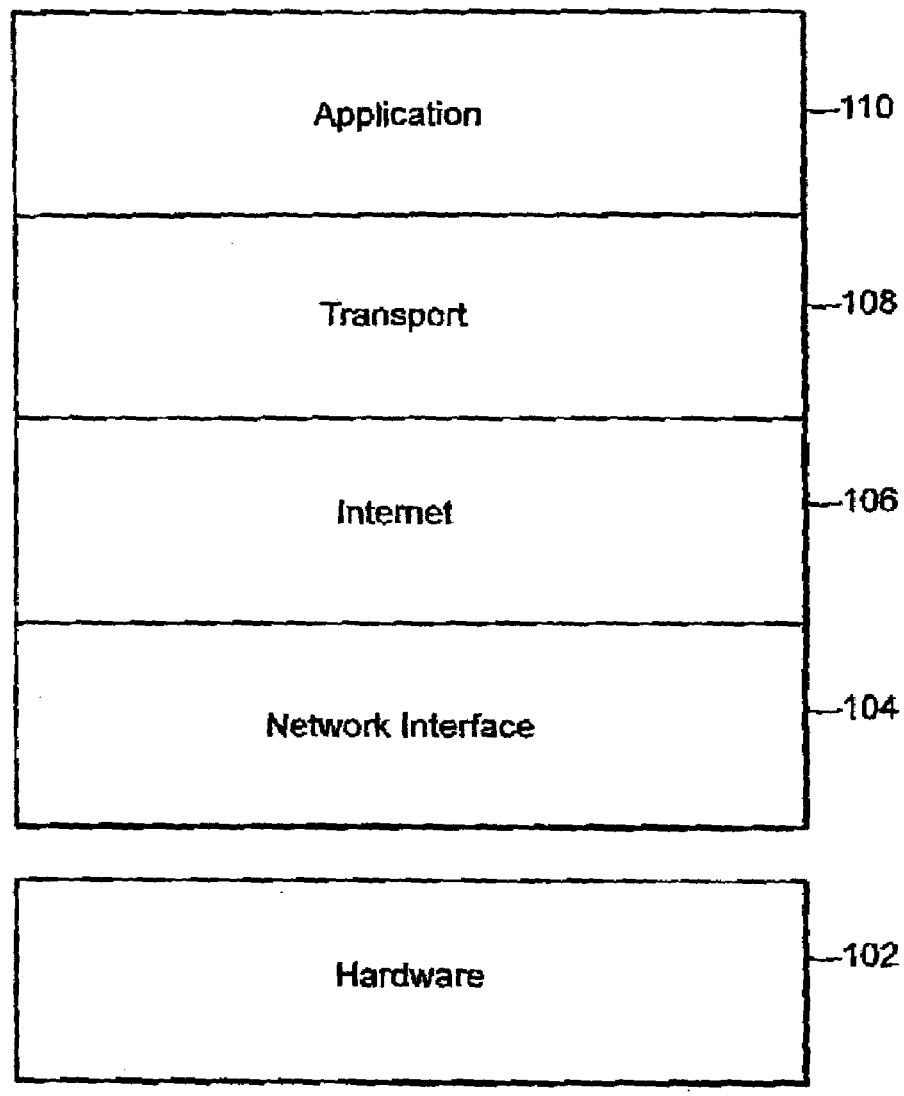
FIG. 1 shows an exemplary protocol stack that is used for TCP/IP networking.

FIG. 1 shows an exemplary protocol stack 100 that is used for TCP/IP networking. The TCP/IP protocol stack is considered to be a four (4) layer protocol stack, and includes a network interface layer 104, an internet layer 106, a transport layer 108, and an application layer 110. The network interface layer 104 is the interface between the TCP/IP protocol stack and the underlying hardware 102. The Internet Protocol (IP) typically operates at the internet layer 106. The Transmission Control Protocol (TCP) and the User Datagram Protocol (UDP) typically operate at the transport layer 108. Various routing protocols, such as the Routing Information Protocol (RIP) and Open Shortest Path First (OSPF), typically operate at the application layer 110. The TCP/IP protocol suite includes many other protocols that operate at various layers of the stack.

Figure 2:
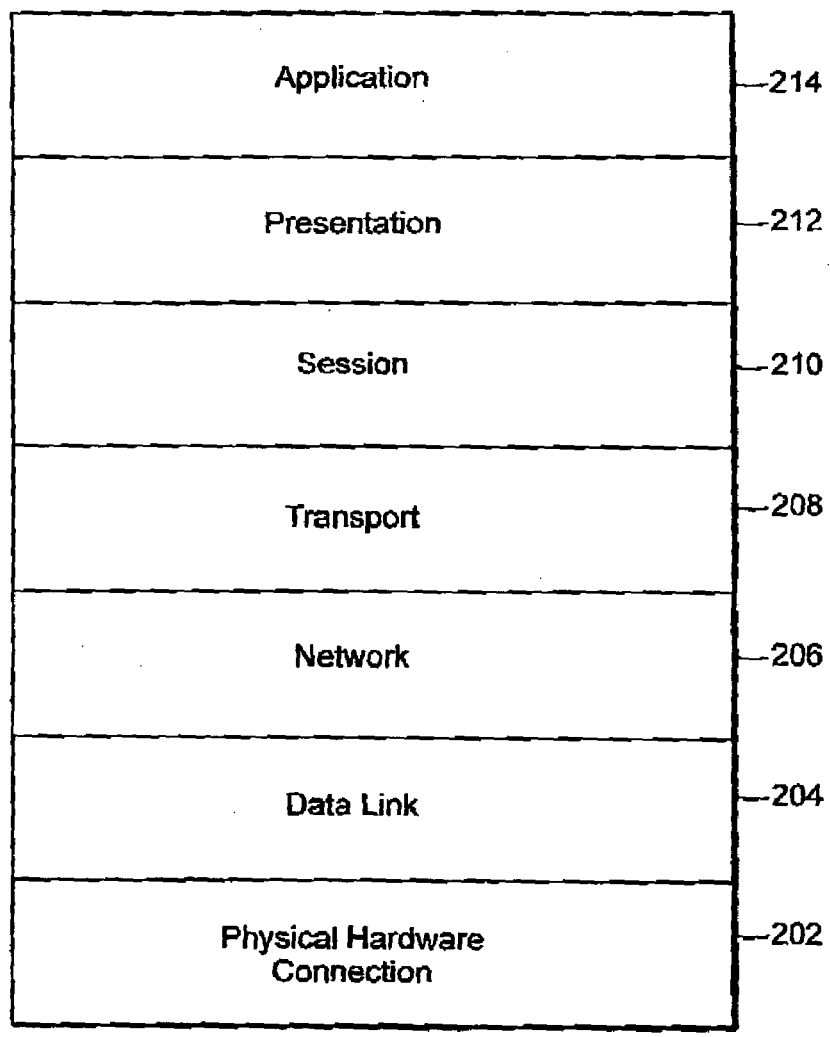
FIG. 2 shows an exemplary protocol stack in accordance with a standard seven layer model.

FIG. 2 shows an exemplary protocol stack 200 that reflects the International Organization for Standardization (ISO) seven (7) layer model. The protocol stack 200 includes a physical hardware connection layer 202, a data link layer 204, a network layer 206, a transport layer 208, a session layer 210, a presentation layer 212, and an application layer 214. One common networking protocol, known as X.25, implements the lower three (3) layers of the ISO seven (7) layer model.

Other than a protocol operating at the lowest layer of a protocol stack, any protocol operating at any protocol layer may require priority forwarding. When installed as an upper layer protocol above a lower layer protocol, the upper layer protocol provides a priority function to the lower layer protocol, preferably by passing to the lower layer protocol a reference to the priority function (such as an address of the priority function). When the lower layer protocol receives a protocol message for the upper layer protocol, the lower layer protocol invokes the upper layer protocol's priority function and obtains therefrom a priority indicator indicating whether the protocol message is a high priority protocol message or a low priority protocol message. The lower layer protocol places the protocol message in the appropriate queue based upon the priority indicator obtained from the upper layer protocol's priority function.

Figure 3:
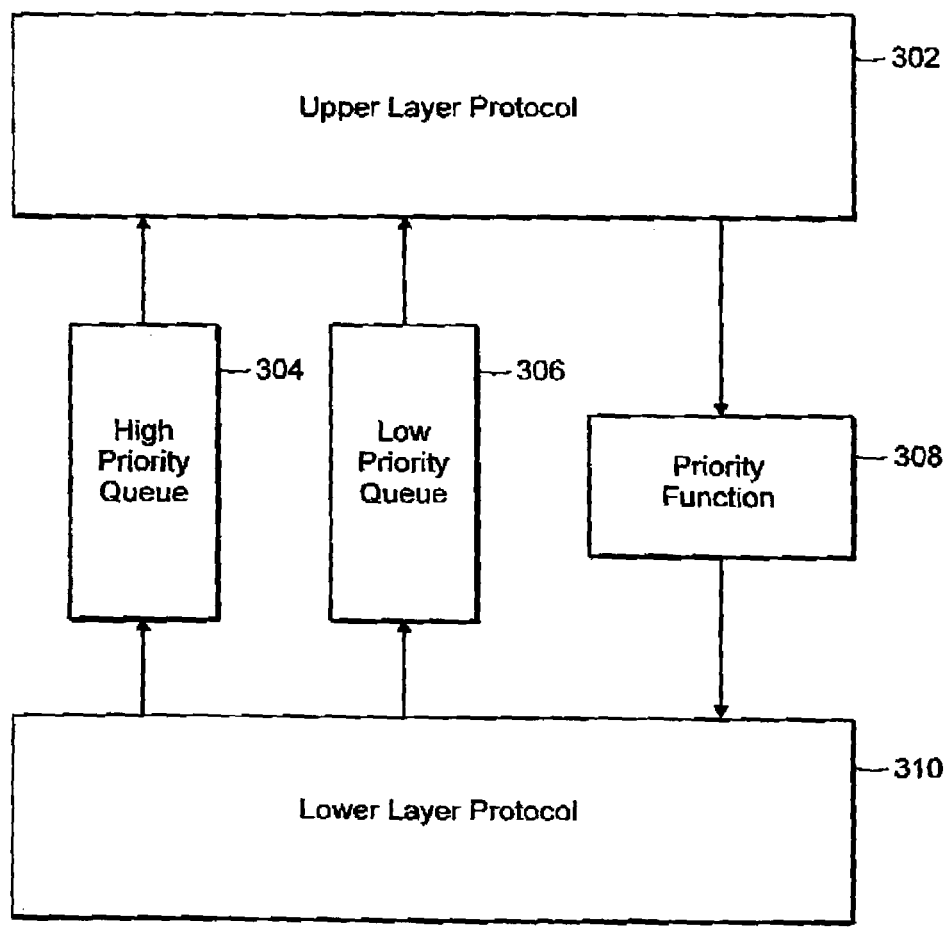
FIG. 3 is a conceptual view of a portion of a protocol stack including an upper layer protocol that interfaces to a lower layer protocol via a high priority message queue, a low priority message queue, and a priority function in accordance with an embodiment of the present invention.

FIG. 3 is a conceptual view of a portion of a protocol stack 300 including an upper layer protocol 302 and a lower layer protocol 310. The lower layer protocol 310 passes protocol messages to the upper layer protocol 302 over a high priority queue 304 and a low priority queue 306. The upper layer protocol 302 provides the priority function 308 to the lower layer protocol 310 when the upper layer protocol 302 is installed in the protocol stack above the lower layer protocol 310. The lower layer protocol 310 invokes the priority function 308 in order to determine a priority for each protocol message destined for the upper layer protocol 302.

Figure 4:
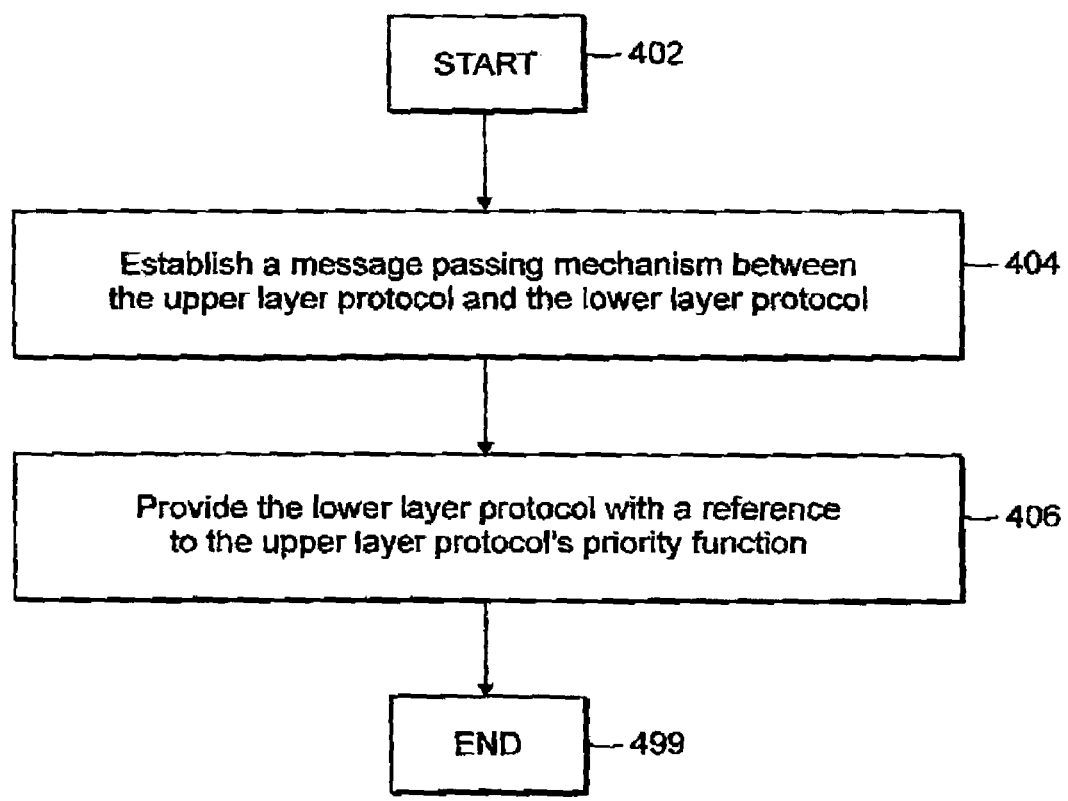
FIG. 4 is a logic flow diagram showing exemplary logic for installing an upper layer protocol above a lower layer protocol in a protocol stack in accordance with an embodiment of the present invention.

FIG. 4 is a logic flow diagram showing exemplary logic 400 for installing an upper layer protocol above a lower layer protocol in a protocol stack. Beginning at step 402, the logic establishes a message passing mechanism between the upper layer protocol and the lower layer protocol, in step 404, and provides the lower layer protocol with a reference to the upper layer protocol's priority function, in step 406. The logic 400 terminates in step 499.

Figure 5:
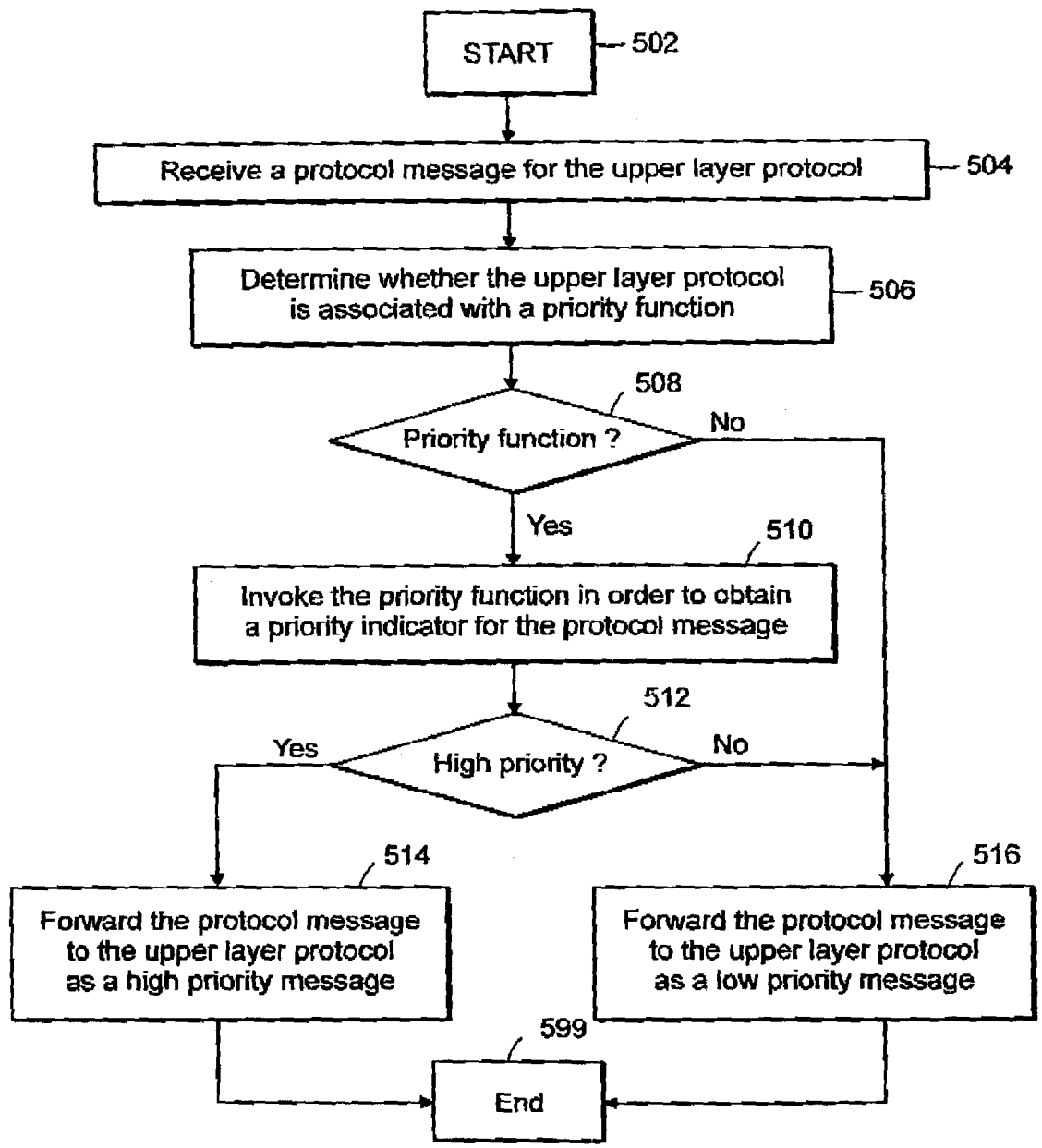
FIG. 5 is a logic flow diagram showing exemplary logic for forwarding a protocol message by the lower layer protocol to the upper layer protocol in accordance with an embodiment of the present invention.

FIG. 5 is a logic flow diagram showing exemplary logic 500 for forwarding a protocol message by the lower layer protocol to the upper layer protocol. Beginning at step 502, and upon receiving a protocol message for the upper layer protocol, in step 504, the logic determines whether the upper layer protocol is associated with a priority function, in step 506. If the upper layer protocol is not associated with a priority function (NO in step 508), then the logic forwards the protocol message to the upper layer protocol as a low (normal) priority message. However, assuming the upper layer protocol is associated with a priority function (YES in step 508), the logic invokes the priority function in order to obtain a priority indicator indicating a priority for the protocol message, in step 510. If the protocol indicator indicates that the protocol message is a high priority protocol message (YES in step 512), then the logic forwards the protocol message to the upper layer protocol as a high priority message, in step 514, for example, by placing the protocol message on a high priority message queue. If the protocol indicator indicates that the protocol message is a low priority protocol message (NO in step 512), then the logic forwards the protocol message to the upper layer protocol as a low priority message, in step 516, for example, by placing the protocol message on a low priority message queue. The logic 500 terminates in step 599.

FIG. 6 is a logic flow diagram showing exemplary priority function logic 600 in accordance with an embodiment of the present invention. Beginning at step 602, and upon being invoked by the lower layer protocol, the logic determines the protocol message priority based upon protocol-specific considerations, in step 604. If the logic determines that the protocol message is a high priority protocol message (YES in step 606), then the logic returns a high priority indicator to the lower layer protocol, in step 608. If the logic determines that the protocol message is a low priority protocol message (NO in step 606), then the logic returns a low priority indicator to the lower layer protocol, in step 610. The logic 600 terminates in step 699.

In the exemplary embodiments of the invention described above, the priority function is used to distinguish between two priority levels, specifically a high priority and a low priority. However, the present invention is in no way limited to two priority levels. The priority function may be used to distinguish between more than two priority levels, and more than two queues may be used for the lower layer protocol to forward the protocol messages to the upper layer protocol. The present invention is not limited by the number of priority levels distinguished by the priority function.

Also, in the exemplary embodiments of the invention described above, multiple queues are used to forward protocol messages from the lower layer protocol to the upper layer protocol. However, the present invention is in no way limited to the use of multiple queues for forwarding protocol messages. Other forwarding mechanisms may be used. For example, a single queue may be used for forwarding low priority protocol messages, while an interrupt- or event-based mechanism may be used to forward high priority protocol messages. The present invention is not limited by the mechanism or mechanisms used for forwarding protocol messages.

Also, in the exemplary embodiments of the invention described above, the upper layer protocol provides the lower layer protocol with a reference to the priority function, specifically by passing a pointer to the priority function. However, the present invention is in no way limited passing a pointer to the priority function. Other reference mechanisms may be used. For example, the upper layer protocol and the lower layer protocol may interface through a function table, in which case the upper layer protocol provides the lower layer protocol with a reference to the priority function by storing a pointer to the priority function in an appropriate location in the function table. The present invention is not limited to the mechanism by which the upper layer protocol provides the lower layer protocol with a reference to the priority function.

In an exemplary embodiment of the present invention, predominantly all of the priority forwarding logic is implemented as a set of computer program instructions that are stored in a computer readable medium and executed by an embedded microprocessor system within a network device. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

We claim:

1. A method for forwarding a message between a first protocol and a second protocol, the method comprising:
    associating with the first protocol a priority function for assigning a priority level to the message;
    invoking the priority function by the second protocol in order to determine the priority level for the message; and
    forwarding the message along with an indication of the priority level for the message from the second protocol to the first protocol.

2. The method of clam 1, wherein the priority function determines the priority level for the message based upon protocol-specific elements of the first protocol.

3. The method of claim 1, wherein invoking the priority function by the second protocol comprises:
    providing the second protocol with access to the priority function, by providing a reference to the priority function.

4. The method of claim 3, wherein providing the second protocol with access to the priority function comprises:
    providing the second protocol with a pointer to the priority function.

5. The method of claim 1, wherein forwarding the message by the second protocol to the first protocol comprising:
    maintaining a plurality of queues, each queue corresponding to one of the plurality of priority levels; and
    placing the message on the queue corresponding to the priority level.

6. A device comprising:
    a priority function for assigning a priority level to a message associated with a first protocol; and
    a second protocol operably coupled to invoke the priority function in order to determine the priority level for the message, wherein the second protocol is operably coupled to forward the message to the first protocol along with an indication of the priority level for the message.

7. The device of claim 6, wherein the priority function determines the priority level for the message based upon protocol-specific elements of the first protocol.

8. The device of claim 6, wherein the first protocol is operably coupled to provide the second protocol with access to the priority function, by providing a reference to the priority function.

9. The device of claim 8, wherein the first protocol is operably coupled to provide the second protocol with access to the priority function by providing the second protocol with a pointer to the priority function.

10. The device of claim 6, further comprising a plurality of queues interposed between the first protocol and the second protocol for interfacing the second protocol to the first protocol, wherein each queue corresponds to one of the plurality of priority levels, and wherein the second protocol is operably coupled to place the message on the queue corresponding to the priority level.

11. A program product comprising a computer readable medium having embodied therein a computer program for providing priority forwarding of messages, the computer program comprising:
    a priority function for assigning a priority level to a message associated with a first protocol; and a second protocol programmed to invoke the priority function in order to determine the priority level for the message, wherein the second protocol is programmed to forward the message to the first protocol along with an indication of the priority level for the message.

12. The program product of claim 11, wherein the priority function is programmed to determine the priority level for the message based upon protocol-specific elements of the fist protocol.

13. The program product of claim 11, wherein the first protocol is programmed to provide the second protocol with access to the priority function.

14. The program product of claim 13, wherein the first protocol is programmed to provide the second protocol with access to the priority function by providing the second protocol with a pointer to the priority function.

15. The program product of claim 11, wherein the second protocol is programmed to forward the message to the first protocol by determining a queue from among a plurality of queues based upon the priority level for the message and placing the message on the queue corresponding to the priority level.

* * * * *